(12) United States Patent
van den Berg

(10) Patent No.: US 11,807,241 B2
(45) Date of Patent: Nov. 7, 2023

(54) SYSTEM AND METHOD FOR CONTROLLING ENGINE FUELING AND VEHICLE INCLUDING SUCH A SYSTEM

(71) Applicants: VOLVO TRUCK CORPORATION, Gothenburg (SE); Jan van den Berg, Curitiba (BR)

(72) Inventor: Jan van den Berg, Curitiba (BR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/642,746

(22) PCT Filed: Oct. 24, 2019

(86) PCT No.: PCT/BR2019/050460
§ 371 (c)(1),
(2) Date: Mar. 14, 2022

(87) PCT Pub. No.: WO2021/077182
PCT Pub. Date: Apr. 29, 2021

(65) Prior Publication Data
US 2022/0324451 A1    Oct. 13, 2022

(51) Int. Cl.
*B60W 10/06* (2006.01)
*B60W 10/11* (2012.01)
(Continued)

(52) U.S. Cl.
CPC ........ *B60W 30/1882* (2013.01); *B60W 10/06* (2013.01); *B60W 10/11* (2013.01);
(Continued)

(58) Field of Classification Search
CPC .. B60W 10/06; B60W 10/11; B60W 30/1882; B60W 2710/0627;
(Continued)

(56) References Cited

U.S. PATENT DOCUMENTS 4,353,272 A    10/1982  Schneider et al.
4,408,585 A *  10/1983  Stuckas ............... F02D 41/1446
                                                       123/676

(Continued)

FOREIGN PATENT DOCUMENTS

DE    102006000321 A1    1/2007
EP        3282113 A1    2/2018
(Continued)

OTHER PUBLICATIONS

International Search Report (dated Jul. 30, 2020) for corresponding International App. PCT/BR2019/050460.
(Continued)

*Primary Examiner* — Edwin A Young
(74) *Attorney, Agent, or Firm* — WRB-IP PLLC

(57) ABSTRACT

A system is provided for controlling engine fueling and includes an internal combustion engine, a fuel source, means for delivering fuel from the fuel source to the engine, and a controller configured to control the fuel delivering means according to a first operational mode so that, upon attaining a predetermined operational state of the engine, an amount of fuel delivered to the engine per unit time is kept constant. The system will typically but not necessarily be provided in a vehicle such as a truck or a passenger automobile. A method for controlling engine fueling is also provided.

19 Claims, 9 Drawing Sheets

(51) Int. Cl.
*B60W 30/188* (2012.01)
*F02D 1/04* (2006.01)
*F02D 41/12* (2006.01)
*F16H 59/74* (2006.01)
*F16H 61/02* (2006.01)

(52) U.S. Cl.
CPC ............... *F02D 1/04* (2013.01); *F02D 41/12* (2013.01); *F16H 59/74* (2013.01); *F16H 61/0204* (2013.01); *B60W 2710/0627* (2013.01); *B60W 2710/0644* (2013.01); *B60W 2710/0666* (2013.01); *B60W 2710/0677* (2013.01); *B60W 2710/1005* (2013.01); *F02D 2200/0614* (2013.01); *F02D 2200/101* (2013.01); *F02D 2200/1002* (2013.01)

(58) Field of Classification Search
CPC . B60W 2710/0644; B60W 2710/0666; B60W 2710/0677; B60W 2710/1005; F02D 1/04; F02D 41/12; F02D 2200/0614; F02D 2200/1002; F02D 2200/101; F16H 59/74; F16H 61/0204
See application file for complete search history.

(56) References Cited

U.S. PATENT DOCUMENTS

| | | |
|---|---|---|
| 5,113,829 A | 5/1992 | Motoyama |
| 5,150,635 A | 9/1992 | Minowa et al. |
| 5,875,761 A | 3/1999 | Fujieda et al. |
| 6,361,471 B1 | 3/2002 | Heed |
| 6,616,575 B1 | 9/2003 | Lorentz |
| 7,527,041 B2 | 5/2009 | Wing et al. |
| 9,677,495 B2 | 6/2017 | Shibata et al. |
| 2007/0276570 A1 | 11/2007 | AbuSamra |
| 2016/0230733 A1* | 8/2016 | Grange ............... F02M 37/32 |
| 2017/0174219 A1 | 6/2017 | Omran et al. |
| 2018/0194351 A1* | 7/2018 | Haupts ................ B60K 31/00 |
| 2018/0265074 A1* | 9/2018 | Lovelace ............ B60K 6/485 |
| 2019/0135280 A1* | 5/2019 | Kishi ................ B60W 40/1005 |
| 2020/0001858 A1* | 1/2020 | Bennett ........... B60W 30/1882 |

FOREIGN PATENT DOCUMENTS

| | | |
|---|---|---|
| GB | 1464378 | 2/1977 |
| JP | 2005163549 A | 6/2005 |
| WO | 2018158571 A1 | 9/2018 |

OTHER PUBLICATIONS

European Search Report (dated Jul. 19, 2023) for corresponding European App. 19950208.9.

* cited by examiner

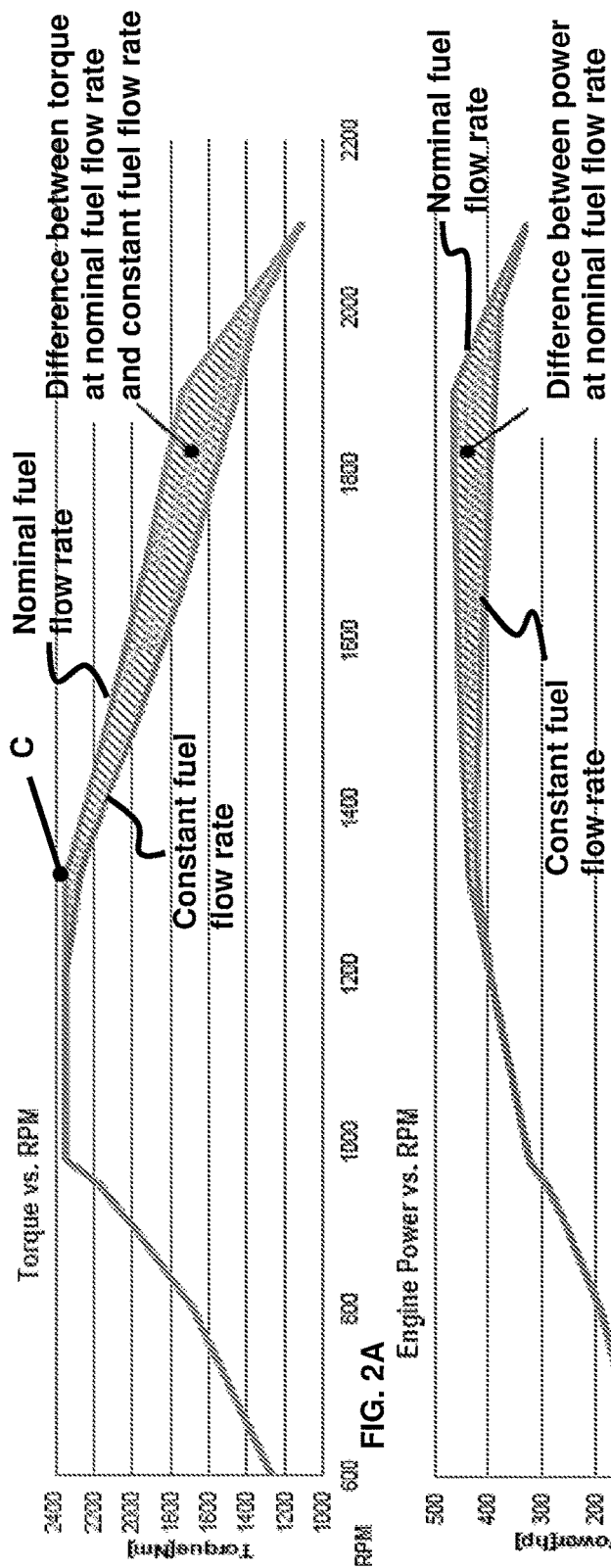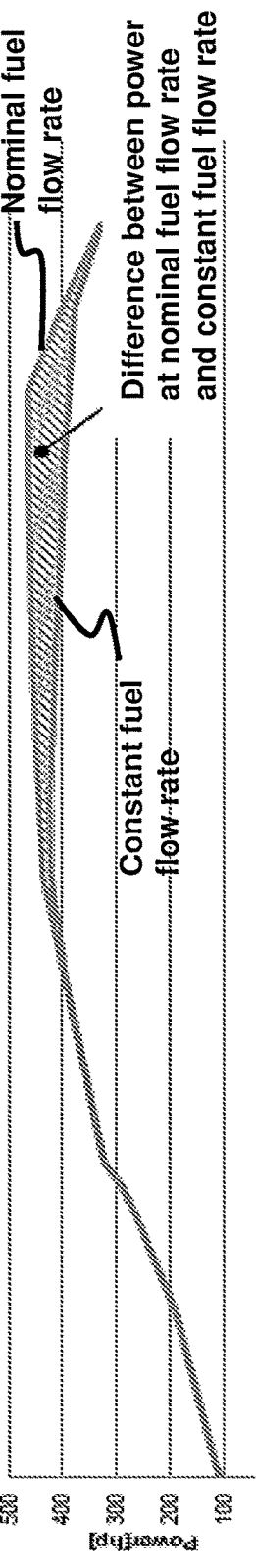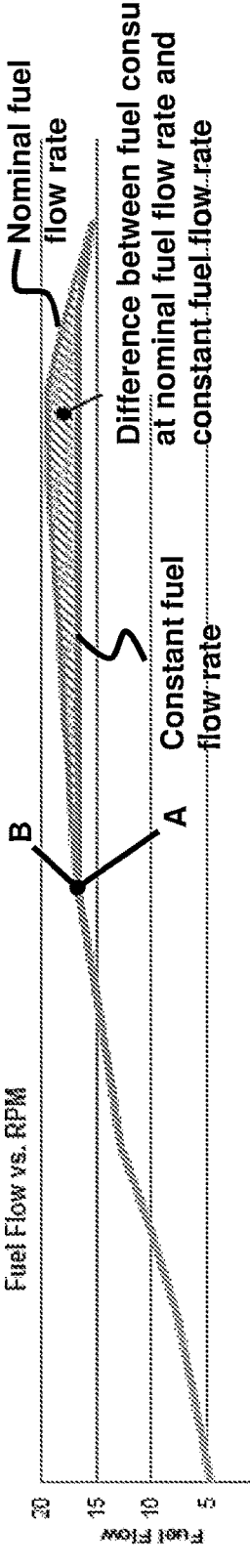
FIG. 2A
FIG. 2B
FIG. 2C

SYSTEM AND METHOD FOR CONTROLLING ENGINE FUELING AND VEHICLE INCLUDING SUCH A SYSTEM

BACKGROUND AND SUMMARY

The present application is directed to a system and method for controlling engine fueling.

A typical objective in controlling engine speed and power delivery in vehicles is to optimize brake specific fuel consumption (BSFC) where BSFC=fuel mass/time=Power. Operation under conditions designed to optimize BSFC may, however, result in unnecessary fuel consumption. For example, a vehicle operated to optimize BSFC at full load with an engine speed of, for example, 1300 RPM may take longer to arrive at a destination than the same vehicle operated to optimize BSFC at full load with an engine speed of 1800 RPM, but the former vehicle may use less fuel than the latter vehicle. A vehicle designed to be operated to optimize BSFC is not designed to be operated in a manner that will necessarily optimize fuel consumption, even though the difference in drive time and operator perception of vehicle performance may be negligible.

It is desirable to provide a system and method for a vehicle that facilitates operation of the vehicle in a manner that will tend to reduce fuel consumption.

In accordance with an aspect of the invention, a system for controlling engine fueling, comprises an internal combustion engine, a fuel source, means for delivering fuel from the fuel source to the engine, and a controller configured to control the fuel delivering means according to a first operational mode so that, upon attaining a predetermined operational state of the engine, an amount of fuel delivered to the engine per unit time is kept constant.

The system will typically but not necessarily be provided in a vehicle such as a truck or a passenger automobile.

In accordance with another aspect of the present invention, a method for controlling engine fueling comprises delivering fuel to the engine via a fuel delivering means, and controlling an amount of fuel delivered to the engine in a first operating mode so that, upon attaining a predetermined operational state of the engine, an amount of fuel delivered to the engine per unit time is kept constant.

BRIEF DESCRIPTION OF THE DRAWINGS

The features and advantages of the present invention are well understood by reading the following detailed description in conjunction with the drawings in which like numerals indicate similar elements and in which:

FIGS. 2A-2C compare nominal full load operation of an illustrative engine versus operation at constant fuel delivery according to a first operational mode via torque versus RPM, engine power versus RPM, and fuel flow versus RPM, respectively;

DETAILED DESCRIPTION

Figure 1:
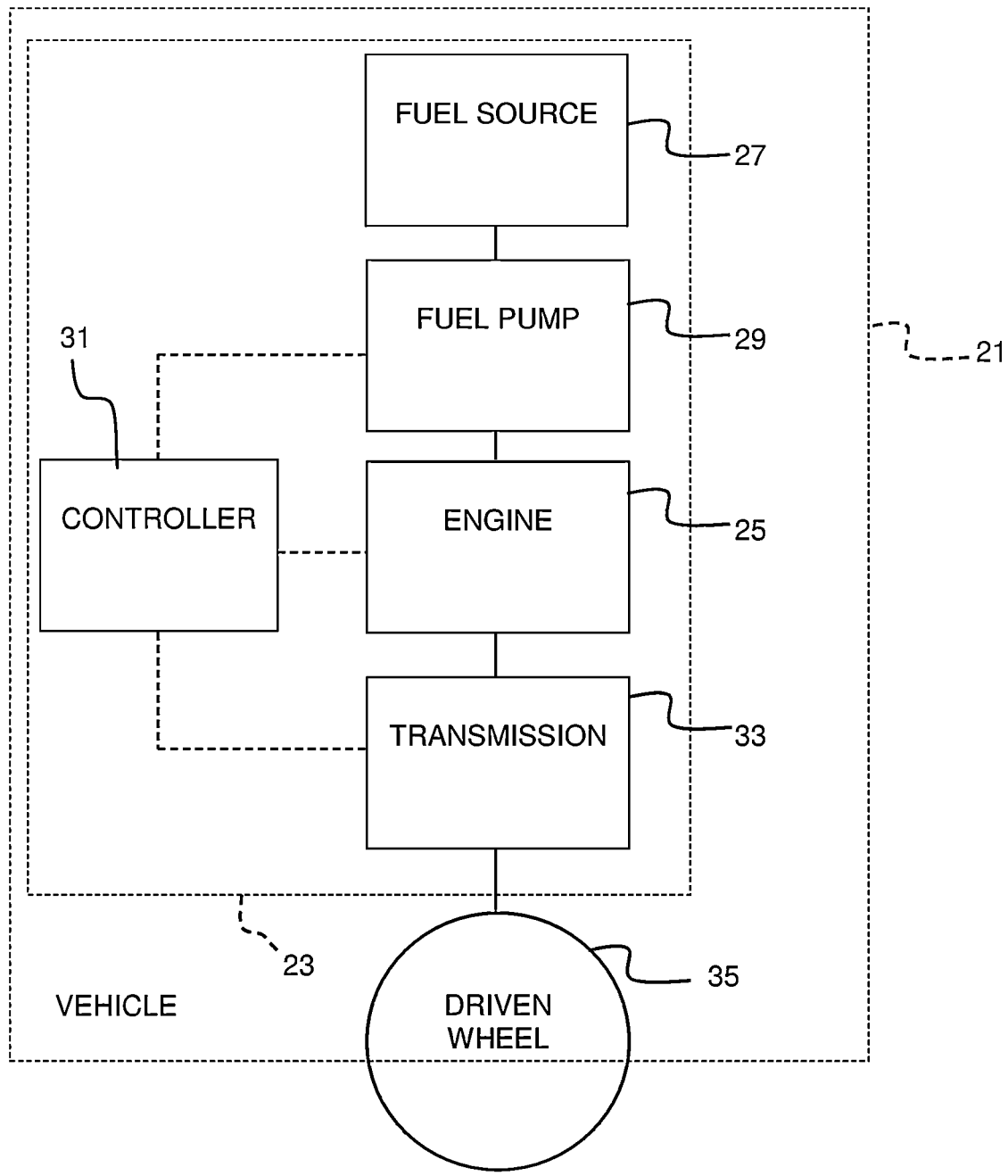
FIG. 1 is a schematic view of a vehicle including a system for controlling engine fueling according to an aspect of the present invention.

A vehicle 21 including a system 23 for controlling engine fueling is shown schematically in FIG. 1. The vehicle 21 can be any type of vehicle including an internal combustion engine, such as but not necessarily limited to a truck or a passenger automobile.

The system 23 comprises an internal combustion engine 25, a fuel source 27 such as a fuel tank, and means 29, such as a fuel pump and conduit between the pump and the engine, for delivering fuel from the fuel source to the engine. The system 23 further comprises a controller 31 such as an engine control unit (ECU) or other suitable device configured to control the fuel delivering means 29 according to a first operational mode so that, upon attaining a predetermined operational state of the engine, an amount of fuel delivered to the engine 25 per unit time is kept constant. The present invention involves the surprising discovery that a fuel savings can often be realized with little or no discernable diminution in performance relative to nominal operation by maintaining the amount of fuel delivered to the engine at a constant rate, even though engine efficiency may not be optimized.

The controller 31 is also configured to switch control of the fuel delivering means 29 from the first operational mode to a second, nominal operational mode in which an amount of fuel delivered to the engine 25 per unit time is permitted to range between a minimum and a maximum possible amount of fuel deliverable by the fuel delivering means. Nominal operation is ordinarily operation to optimize engine efficiency, but may be based on other operational characteristics. The controller 31 can switch control of the fuel delivering means 29 from the first operational mode to the second operational mode in any suitable fashion, such as via operator control or automatically upon occurrence of some triggering event or condition, such as a sudden, significant increase in load. Similarly, the controller 31 can switch control of the fuel delivering means 29 from the second operational mode to the first operational mode in any suitable fashion, such as via operator control or automatically upon occurrence of some triggering event or condition (e.g., attaining a predetermined engine operational state such as fuel flow rate, engine speed, torque, power), or both.

The predetermined operational state of the engine 25 at which the controller 31 switches to the first operational mode may be selected as any one or more of a variety of operational states of the engine. The predetermined operational state of the engine 25 may, for example, be a predetermined speed of the engine. For example, if a particular model of engine operates most efficiently at full load at 1300 revolutions per minute (RPM), the controller 31 can be configured to trigger the first operational mode and maintain fuel delivery at a constant rate when engine speed at full load reaches 1300 RPM. FIGS. 2A-2C compare nominal operation of an illustrative engine versus operation at constant fuel delivery according to the first operational mode via torque v. RPM, engine power v. RPM, and fuel flow v. RPM. In these graphs, the first operational mode is initiated at 1300 RPM (point A on FIG. 2C) and full load and fuel delivery is about 17 grams/second (g/s). It will be seen that, when engine speed increases to, for example 1900 RPM, fuel delivery remains at 17 g/s in the first operational mode, but increases to nearly 20 g/s in nominal operation. It will be seen that torque and engine power are typically reduced in the first operational mode, however, the reduction will often not be sufficiently significant to affect operation.

The predetermined operational state of the engine 25 may be a predetermined fuel flow rate. For example, in FIGS. 2A-2C, the first operational mode may be initiated when fuel flow rate reaches approximately 17 g/s at point B on FIG. 2C (which, in this example, happens to be at 1300 RPM).

The predetermined operational state of the engine 25 may be attained when the fuel supply and engine power output provides a desired brake specific fuel consumption (BSFC) where BSFC=fuel mass/time÷Power (this curve can be derived from graphs at FIGS. 2C and 2B).

The predetermined operational state of the engine 25 may be attained when peak engine torque at maximum engine speed and full load demand of the engine is achieved, i.e., at point C at the right hand side of the nominal operation torque plateau in FIG. 2A.

Figure 4A:
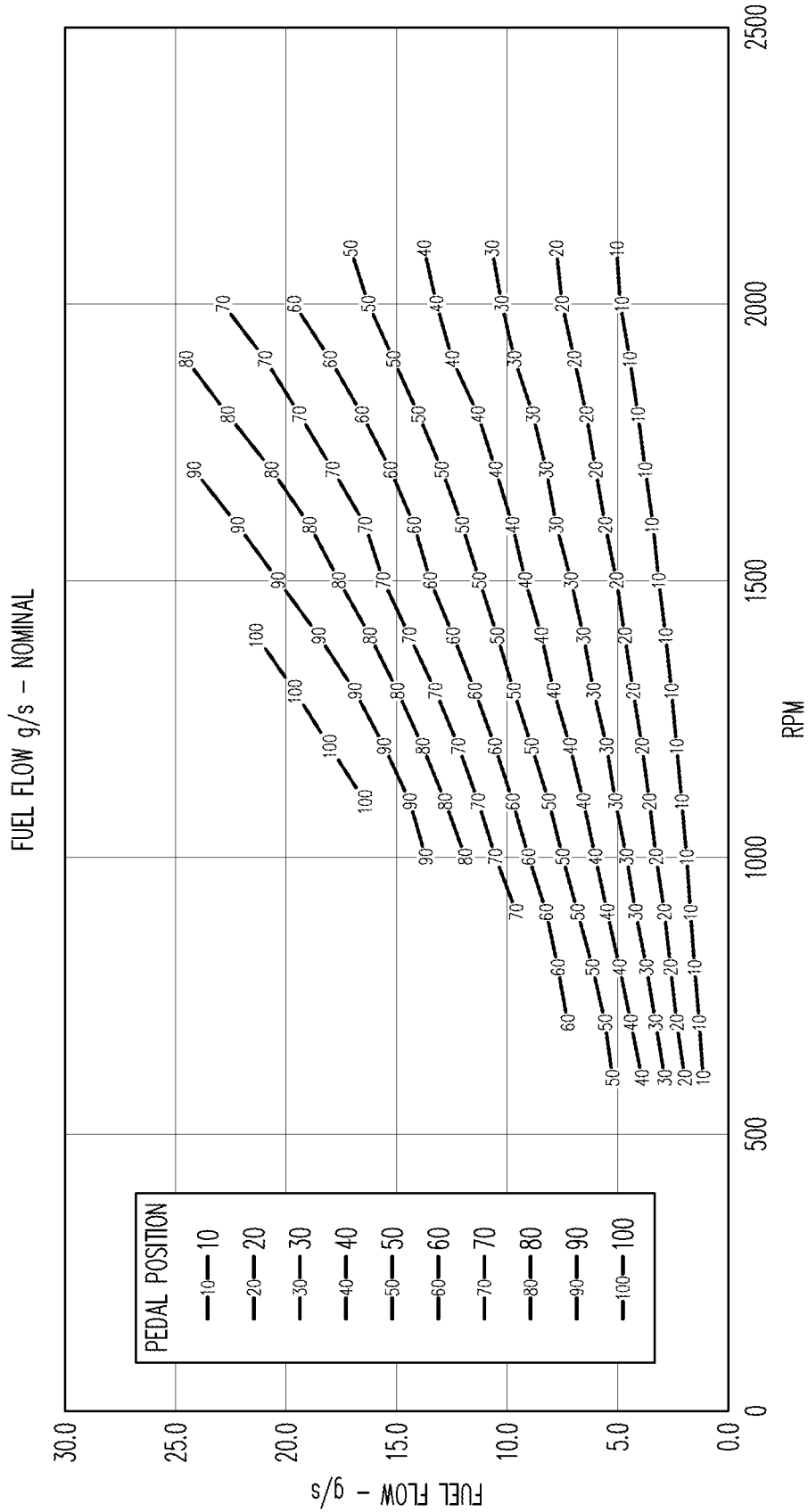
FIGS. 4A-4C show nominal operation of an illustrative engine at various partial loads and FIGS. 5A-5C show operation of the engine at the various partial loads where fuel delivery is constant above 1300 RPM via fuel flow versus RPM (FIGS. 4A and 5A), engine power versus RPM (FIGS. 4B and 5B), and torque versus RPM (FIGS. 4C and 5C), respectively.
Figure 4B:
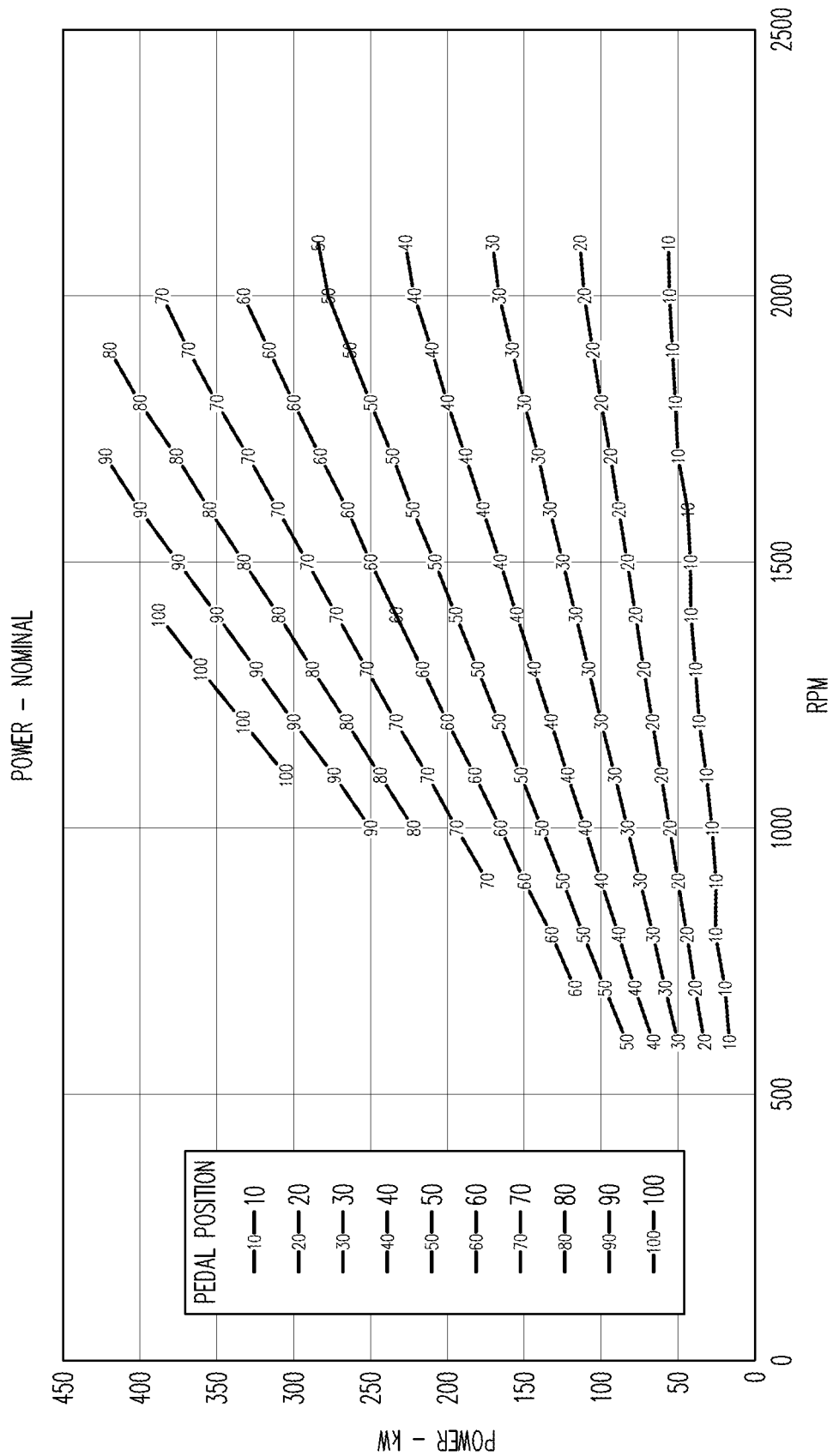
Figure 4C:
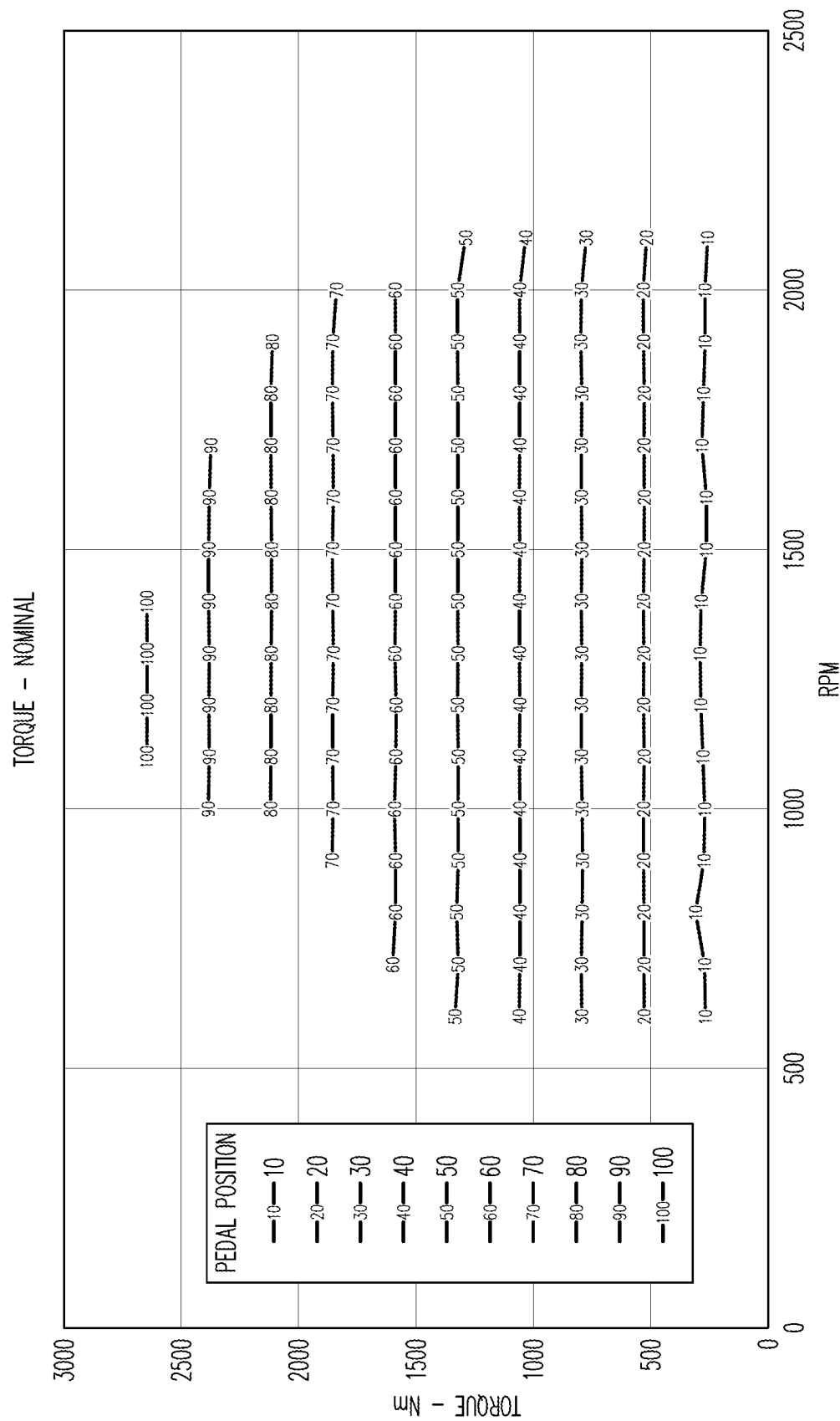
Figure 5A:
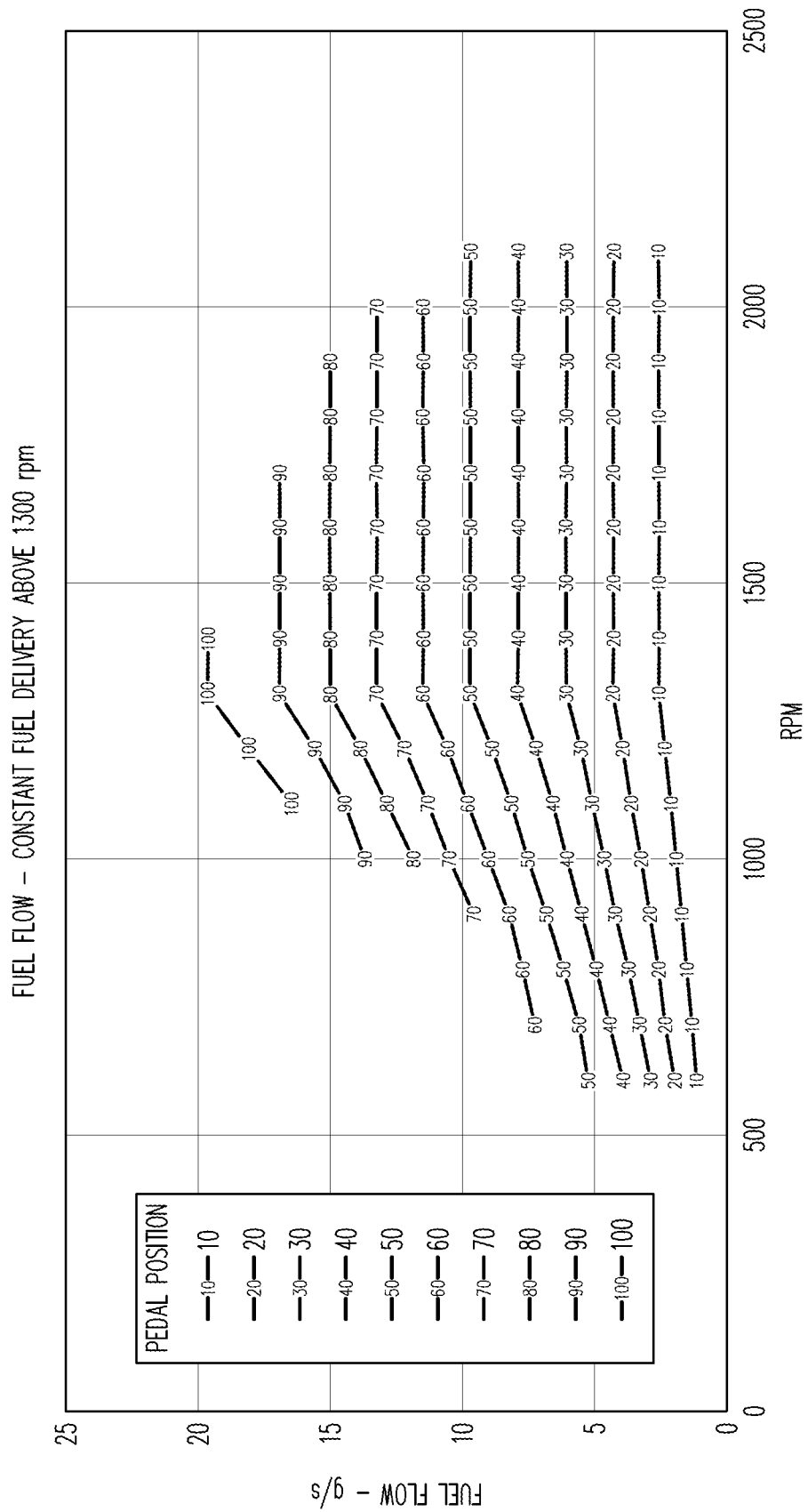
Figure 5B:
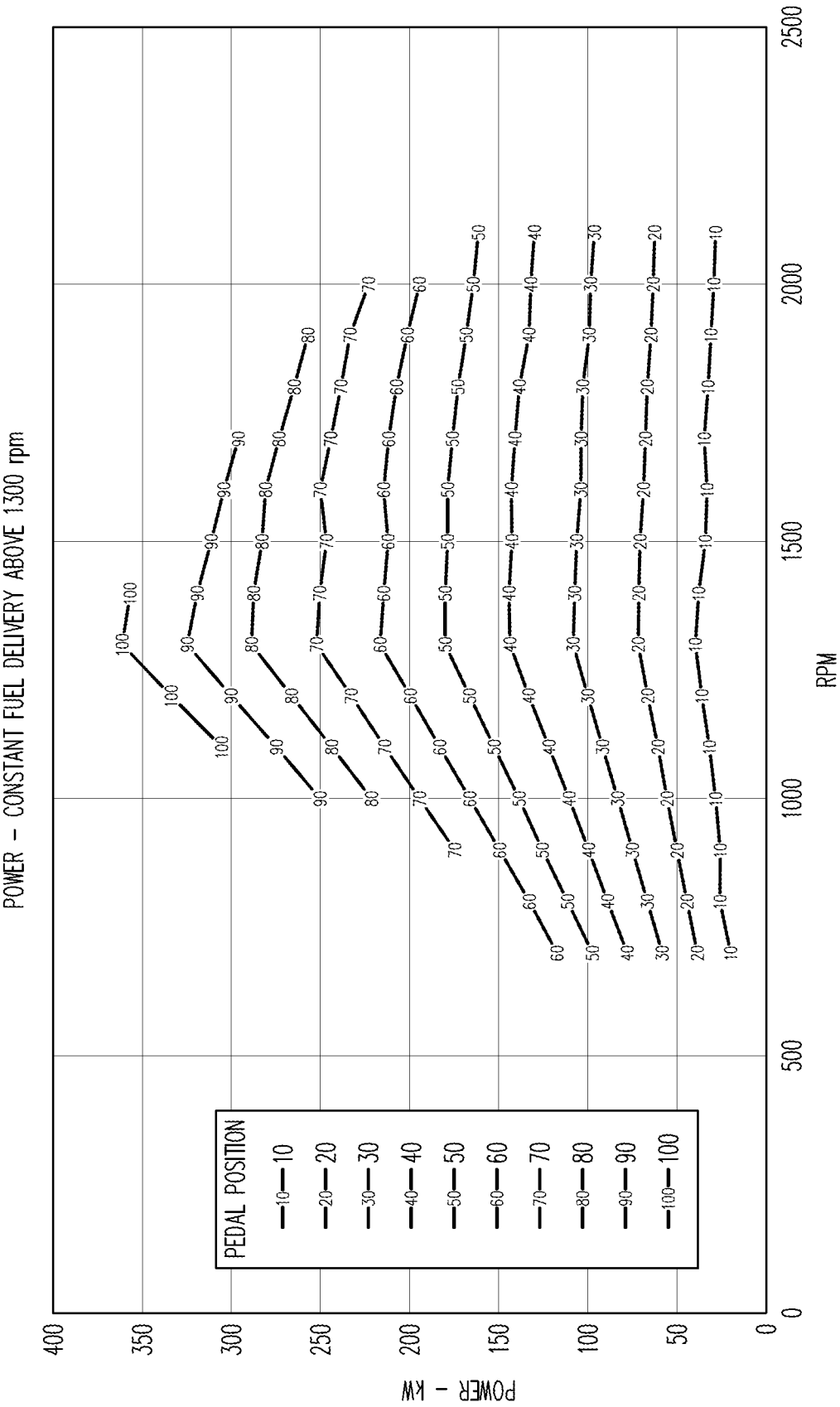
Figure 5C:
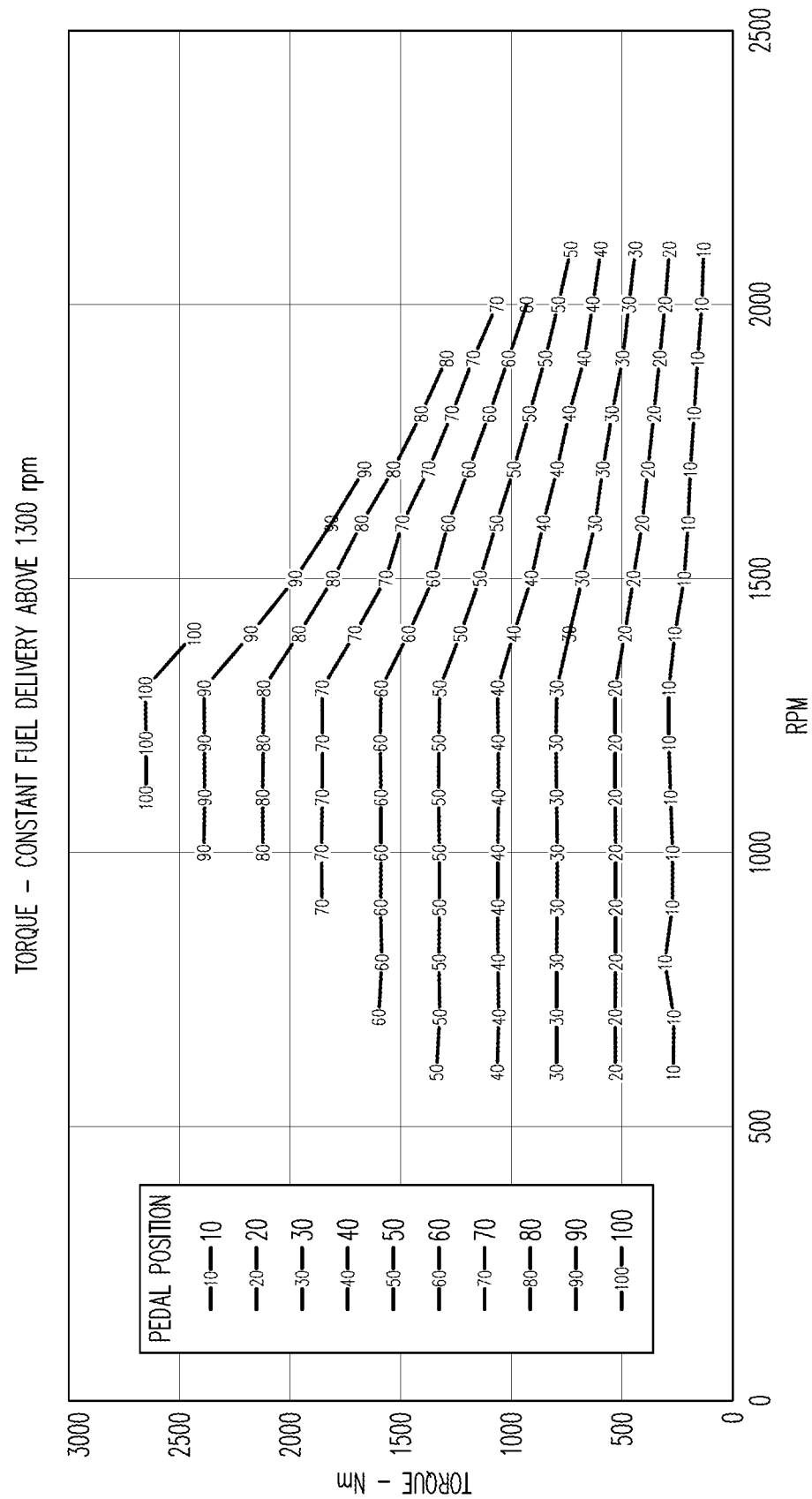

The predetermined operational state of the engine 25 is described in FIGS. 2A-2C in connection with full load of the engine, however, it will be appreciated that curves can also be developed for partial engine load, as well. To illustrate, FIGS. 4A-4C show nominal operation of an illustrative engine at various partial loads, i.e. pedal (accelerator) positions from 10% depressed to 100% depressed, and FIGS. 5A-5C show operation of the engine at the various partial loads where fuel delivery is constant above 1300 RPM via fuel flow versus RPM (FIGS. 4A and 5A), engine power versus RPM (FIGS. 4B and 5B), and torque versus RPM (FIGS. 4C and 5C). It will be seen from these graphs that, regardless of the engine load, it is possible to reduce fuel consumption substantially by holding fuel delivery constant above some point, such as above an engine speed of 1300 RPM (selected for purposes of illustration only), while still providing power and torque that may be adequate to perform desired operations.

It will further be understood that the predetermined operational states of the engine 25 discussed above, i.e. fuel flow rate, engine speed, BSFC, peak engine torque, are merely illustrative and other operational states of the engine can initiate constant delivery of fuel at a constant rate, such as attaining a particular engine power.

The system 23 can further comprise a transmission 33 arranged to receive power output from the engine 25 and to deliver power to at least one driven wheel 35. The transmission 33 can comprise a plurality of gear ratios and the controller 31 is configured to control the transmission to select the one of the plurality of gear ratios that provides a maximum torque at the constant amount of fuel delivered to the engine 25 per unit time. The controller 31 will ordinarily control the fuel delivering means 29 so that the amount of fuel delivered to the engine 25 per unit time is kept constant even if one or more of the gear ratio of the transmission 33 is changed or a speed of the engine changes.

Figure 3:
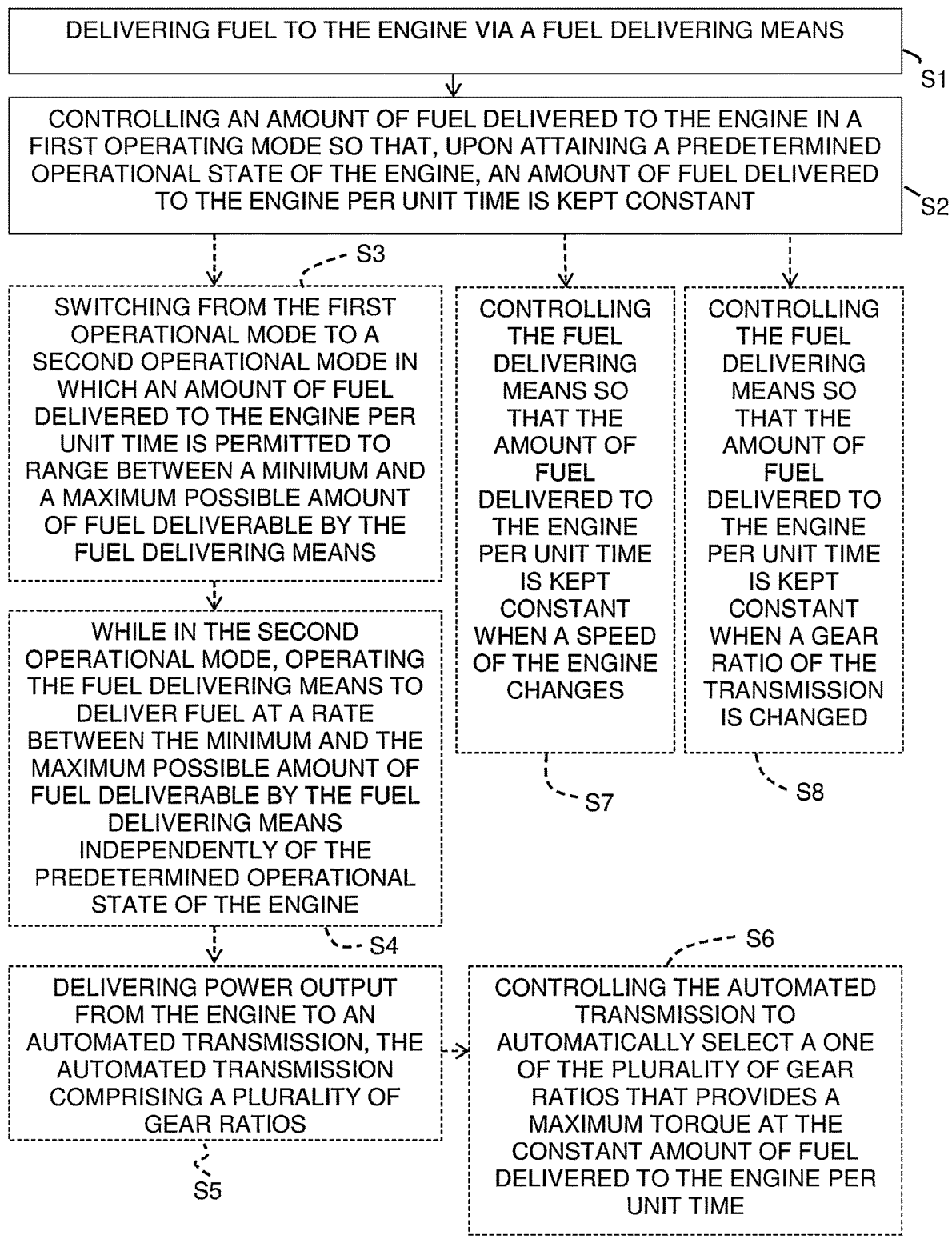
FIG. 3 is a flow chart illustrating steps in a method according to an aspect of the present invention.

In a method for controlling engine 25 fueling according to an aspect of the present invention shown in FIG. 3, in a first step S1, fuel is delivered to the engine via the fuel delivering means 29, and, in a second step S2, an amount of fuel delivered to the engine is controlled in a first operating mode so that, upon attaining a predetermined operational state of the engine, an amount of fuel delivered to the engine per unit time is kept constant. As noted, the predetermined operational state of the engine is a predetermined speed of the engine, a predetermined fuel flow rate, a fuel supply and engine power output that provides a desired brake specific fuel consumption, peak engine torque at maximum engine speed and full load demand of the engine, or any other operational stage of the engine that might be desirable for a particular application, such as attaining a particular engine power output.

The method can comprise, as shown at step S3, switching from the first operational mode to a second operational mode in which an amount of fuel delivered to the engine 25 per unit time is permitted to range between a minimum and a maximum possible amount of fuel deliverable by the fuel delivering means 29. While in the second operational mode, the fuel delivering means 29 can be operated, as shown at step S4, to deliver fuel at a rate between the minimum and the maximum possible amount of fuel deliverable by the fuel delivering means independently of the predetermined operational state of the engine.

The method can comprise delivering, at step S5, power output from the engine 25 to an automated transmission 33, the transmission comprising a plurality of gear ratios. Power from the transmission 33 can be delivered to at least one driven wheel 35. The transmission 33 can be controlled by the controller 31 to automatically select, at step S6, a one of the plurality of gear ratios that provides a maximum torque at the constant amount of fuel delivered to the engine per unit time.

The fuel delivering means 29 can also be controlled by the controller 31 so that the amount of fuel delivered to the engine 25 per unit time is kept constant if, as seen at step S7, a speed of the engine changes and/or, as seen at step S8, if a gear ratio of the transmission is changed.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A system for controlling engine fueling, comprising:
an internal combustion engine;
a fuel source;
means for delivering fuel from the fuel source to the engine;
a transmission arranged to receive power output from the engine and to deliver power to at least one driven wheel; and
a controller configured to control the fuel delivering means according to a first operational mode so that, upon attaining a predetermined operational state of the engine, an amount of fuel delivered to the engine per unit time is kept constant, and configured to control the fuel delivering means according to an initial operation mode before the first operating mode by changing a fuel consumption rate until the predetermined operational state of the engine is attained.

2. The system as set forth in claim 1, wherein the predetermined operational state of the engine is a predetermined speed of the engine.

3. The system as set forth in claim 1, wherein the predetermined operational state of the engine is a predetermined fuel flow rate.

4. The system as set forth in claim 1, wherein the predetermined operational state of the engine is a fuel supply and engine power output that provides a desired brake specific fuel consumption.

5. The system as set forth in claim 1, wherein the predetermined operational state of the engine is peak engine torque at maximum engine speed and full load demand of the engine.

6. The system as set forth in claim 1, wherein the controller is configured to be switched from the first operational mode to a second operational mode in which an amount of fuel delivered to the engine per unit time is permitted to range between a minimum and a maximum possible amount of fuel deliverable by the fuel delivering means.

7. The system as set forth in claim 1, wherein the fuel delivering means comprises a pump and a conduit between the pump and the engine.

8. The system as set forth in claim 1, wherein the transmission comprises a plurality of gear ratios, the controller being configured to control the transmission so that one of the plurality of gear ratios that provides a maximum torque at the constant amount of fuel delivered to the engine per unit time is selected.

9. The system as set forth in claim 1, wherein the transmission comprises a plurality of gear ratios, the controller controlling the fuel delivering means so that the amount of fuel delivered to the engine per unit time is kept constant if one or more of a gear ratio of the transmission is changed or a speed of the engine changes.

10. A vehicle comprising the system of claim 1.

11. A method for controlling engine fueling, comprising:
delivering fuel to an engine via a fuel delivering means;
delivering power output from the engine to a transmission;
controlling an amount of fuel delivered to the engine in a first operating mode so that, upon attaining a predetermined operational state of the engine, an amount of fuel delivered to the engine per unit time is kept constant; and
in an initial operation mode before the first operating mode, changing a fuel consumption rate until the predetermined operational state of the engine is attained.

12. The method as set forth in claim 11, wherein the predetermined operational state of the engine is a predetermined speed of the engine.

13. The method as set forth in claim 11, wherein the predetermined operational state of the engine is a predetermined fuel flow rate.

14. The method as set forth in claim 11, wherein the predetermined operational state of the engine is a fuel supply and engine power output that provides a desired brake specific fuel consumption.

15. The method as set forth in claim 11, wherein the predetermined operational state of the engine is peak engine torque at maximum engine speed and full load demand of the engine.

16. The method as set forth in claim 11, comprising switching from the first operational mode to a second operational mode in which an amount of fuel delivered to the engine per unit time is permitted to range between a minimum and a maximum possible amount of fuel deliverable by the fuel delivering means, and, while in the second operational mode, operating the fuel delivering means to deliver fuel at a rate between the minimum and the maximum possible amount of fuel deliverable by the fuel delivering means independently of the predetermined operational state of the engine.

17. The method as set forth in claim 11,
wherein the transmission comprises a plurality of gear ratios, the method comprising
delivering power from the transmission to at least one driven wheel, and
controlling the transmission to automatically select a one of the plurality of gear ratios that provides a maximum torque at the constant amount of fuel delivered to the engine per unit time.

18. The method as set forth in claim 11,
wherein the transmission comprises a plurality of gear ratios, the method comprising
delivering power from the transmission to at least one driven wheel, and
controlling the fuel delivering means so that the amount of fuel delivered to the engine per unit time is kept constant when a speed of the engine changes.

19. The method as set forth in claim 11,
wherein the transmission comprises a plurality of gear ratios, the method comprising
delivering power from the transmission to at least one driven wheel, and
controlling the fuel delivering means so that the amount of fuel delivered to the engine per unit time is kept constant when a gear ratio of the transmission is changed.

* * * * *